United States Patent
Kaschel

(10) Patent No.: US 6,582,828 B1
(45) Date of Patent: Jun. 24, 2003

(54) DEEP-DRAWN SLIDABLE FOIL BASED ON POLYOLEFINS AND POLYAMIDE

(75) Inventor: Gregor Kaschel, Bomlitz (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 09/743,369

(22) PCT Filed: Jun. 29, 1999

(86) PCT No.: PCT/EP99/04480
§ 371 (c)(1),
(2), (4) Date: Jan. 9, 2001

(87) PCT Pub. No.: WO00/02725
PCT Pub. Date: Jan. 20, 2000

(30) Foreign Application Priority Data

Jul. 10, 1998 (DE) .......................... 198 30 975

(51) Int. Cl.⁷ .............................. B32B 27/32
(52) U.S. Cl. ................. 428/476.9; 428/523; 428/476.1; 428/518; 428/515; 426/395; 426/396; 426/398; 426/415
(58) Field of Search ............... 428/476.9, 523, 428/476.1, 518, 515; 426/395, 396, 398, 415

(56) References Cited

U.S. PATENT DOCUMENTS

| 5,118,563 A | 6/1992 | Akao ............... 428/334 |
| 5,741,566 A | 4/1998 | Högström et al. ......... 428/35.2 |
| 6,068,933 A | 5/2000 | Shepard et al. .......... 428/474.4 |

FOREIGN PATENT DOCUMENTS

| EP | 0 322 189 | 6/1989 | ......... B32B/27/08 |
| EP | 0 507 351 | 10/1992 | ......... B32B/27/32 |
| EP | 0 236 099 | 4/1994 | |
| EP | 0 613 772 | 9/1994 | ......... B32B/27/30 |
| EP | 0 613 774 | 9/1994 | ......... B32B/27/32 |
| EP | 0 638 487 | 2/1995 | ......... B65D/81/34 |
| EP | 0 686 497 | 12/1999 | |

OTHER PUBLICATIONS

Patent Abstracts of Japan, publication No. 06–286084, (Oct. 11, 1994) (Wolff Walsrode AG).

Primary Examiner—James J. Seidleck
Assistant Examiner—Melanie Bissett
(74) Attorney, Agent, or Firm—Norris McLaughlin & Marcus

(57) ABSTRACT

A thermoformable, puncture-resistant multi-layered film with surface slip, prepared by coextrusion and built up from polyolefin-based, polyamide-based and adhesion promoting polymer layers and its use for packaging sharp-edged goods, in particular foodstuffs.

17 Claims, 1 Drawing Sheet

DEEP-DRAWN SLIDABLE FOIL BASED ON POLYOLEFINS AND POLYAMIDE

BACKGROUND OF THE INVENTION

The surface slip of thermoformable films is becoming increasingly important. For economic reasons, automatic insert-placing machines (robots) are used to insert products packaged in film into cartons. An essential prerequisite for insertion by machines is a film with good surface slip. In the case of thermoformable films, the surface slip in the thermoformed regions is critical. If the surface slip of the shaped parts is inadequate, then the carton cannot be filled with the intended number of packages. In addition, product protection by the packaging is an important factor. This means that the film has to have high mechanical load-bearing capacity, in particular towards sharp-edged packaged goods.

To simplify the description of the prior art and the invention, the polymers which are used for films in the area of the present invention and the abbreviations used for these polymers is explained in more detail in the following, in order to simplify the rest of the description. If specific polymers are mentioned here, then these are suitable for the corresponding layers in the film according to the invention.

Polyolefins are referred to as "PO". Examples of polyolefins are low density polyethylene (LDPE), high density polyethylene (HDPE), linear low density polyethylene (LLDPE), polypropylene (PP), polyisobutylene, polybutylene and all other polymers which are prepared from olefins. Furthermore, PO here also includes olefin copolymers consisting of olefins and other monomers, wherein the olefins predominate in the composition. These are, for example, ethylene copolymers with unsaturated esters (e.g. vinyl acetate) and ethylene copolymers with unsaturated carboxylic acids or their salts.

Polyamides (abbreviated to "PA") are understood in the widest sense to be polymeric compounds which are linked together by the acid amide group R—NH—CO—R'. Two groups of polyamides are differentiated: those built up from one parent substance by polycondensation of co-aminocarboxylic acids or polymerisation of their lactams to give polyamide-6 type compounds and those which are produced from two parent substances, diamines and dicarboxylic acids by polycondensation to give polyamide-66 type compounds. In addition, copolyamides are also known, these being a combination of the types of polyamide mentioned.

"PP" is used for polypropylene, no matter what the spatial arrangement of the methyl side-groups. "EPC" is used for copolymers of propylene with 1–10 mol. % of ethylene, wherein the ethylene is randomly distributed in the molecule.

"LDPE" is used for low density polyethylene which has a density in the range 0.86 to 0.93 g/cm$^3$. LDPE molecules are characterised by a high degree of branching.

"LLDPEs" are linear low density polyethylenes which contain, apart from ethylene, one or more α-olefins with more than 3 carbon atoms as comonomers. The following are mentioned here as representative of α-olefins: butene-1, hexene-1,4-methylpentene-1 and octene-1. By polymerisation of the substances mentioned, the typical molecular structure of LLDPEs is produced, which is characterised by a linear main chain with side chains attached thereto. The density varies between 0.86 and 0.935 g/cm$^3$. The melt flow index MFI is normally between 0.3 and 8 g/10 min. In some publications, linear ethylene/α-olefin copolymers are subdivided into VLDPEs and ULDPEs, in accordance with the density. Since, however, according to GNAUCK/FRÜNDT (Einsteig in die Kunststoffechemie Hanser-Verlag 1991, p. 58), the properties, processing and use of these copolymers corresponds largely to those of ethylene homopolymers, the more precise differentiation is not used here.

"HDPE" is used to describe linear polyethylenes of high density which have only a small degree of branching in the molecular chain. The density of HDPE may be between 0.9 g/cm$^3$ and 0.97 g(cm$^3$.

"mPE" is used here to describe an ethylene copolymer which was polymerised using metallocene catalysts. An α-olefin with four or more carbon atoms is preferably used as a comonomer. The polymers prepared using conventional Ziegler-Natta catalysts frequently contain higher concentrations of the α-olefins in the lower molecular weight fractions. As a result of the very uniform catalytic effect of metallocene centres, narrow distributions of molecular weights are found and, during fractionation, very uniform incorporation of the α-olefins in both the high and also the low molecular weight fractions. The density is preferably between 0.900 and 0.930 g/cm$^3$. The molecular weight distribution $M_w/M_n$ is less than 3.5, preferably less than 3.

"EAA" is used for copolymers consisting of ethylene and acrylic acid and "EMAA" for copolymers consisting of ethylene and methacrylic acid. The ethylene content is preferably between 60 and 99 mol. %.

"I" is used to describe olefin-based copolymers in which the molecules are cross-linked via ionic bonding. Ionic cross-linking is reversible, which results in breaking up of the ionic cross-linking at conventional processing temperatures (180° C.–290° C.) and fresh formation in the cooling phase. Copolymers of ethylene and acrylic acid, which are cross-linked with sodium or zinc ions, are normally used as polymers.

"EVA" is used for a copolymer consisting of ethylene and vinyl acetate. The ethylene content is preferably between 60 and 99 mol. %.

"HV" is used for coextrudable, adhesion-promoting polymers (bonding agents). In contrast, adhesives are understood to be non-metallic materials, including polymers, which can bond two layers of film due to surface adhesion and internal strength without substantially altering the structure of the bonded film layers. In contrast to bonding agents, adhesives are not coextrudable, but have to be applied separately by surface application (e.g. lamination) or liquid application. Bonding agents are preferably modified polyolefins such as e.g. LDPE, LLDPE, mPE, EVA, EAA, EMAA, PP, EPC which are grafted with at least one monomer from the group of α,β-monounsaturated dicarboxylic acids such as, for example, maleic acid, fumaric acid, itaconic acid or their acid anhydrides, acid esters, acid amides or acid imides. Other extrudable bonding agents which may be used are also copolymers of ethylene with α,β-monounsaturated dicarboxylic acids such as acrylic acid, methacrylic acid and/or their metal salts with zinc or sodium and/or their $C_1$–$C_4$-alkyl esters, which may also be grafted with at least one monomer from the group of α,β-monounsaturated dicarboxylic acids such as, for example, maleic acid, fumaric acid, itaconic acid or their acid anhydrides, acid esters, acid amides or acid imides. In addition, polyolefins such as e.g. polyethylene, polypropylene, ethylene/propylene copolymers or ethylene/α-olefin copolymers which are grafted with copolymers of ethylene with α,β-monounsaturated dicarboxylic acids such as acrylic acid, methacrylic acid and/or their metal salts with zinc or sodium and/or their $C_1$–$C_4$-alkyl esters, may be used. Particularly suitable bonding agents are polyolefins, in particular ethylene/α-olefin copolymers with grafted α,β-monounsaturated dicarboxylic anhydrides, in particular maleic anhydride. HVs may also contain an ethylene/vinyl acetate copolymer, preferably with a vinyl acetate content of at least 10wt. %.

Different layers in a film are separated in the following by "/". Mixtures of polymers in a layer are signified by round brackets and linked by a "+". Thus the film structure " . . . /LLDPE/(mPE+LDPE)" describes a multi-layered film, wherein the outer layer contains a mixture of mnPE and LDPE. The inner layer consists of LLDPE. The other layers in the film are indicated by " . . . ".

The following documents are regarded as the relevant prior art for the present invention:

EP 0 236 099 describes a 7-layered, coextruded film with a fully symmetric structure. It includes a core layer made of an ethylene/vinyl alcohol copolymer, two outer layers which each contain polymeric material or a mixture of polymeric materials, two polyamide layers bonding to the core layer and two adhesion promoting inner layers which are located between the outer layers and the polyamide layers. The outer layers are preferably linear polyethylenes. Films of this type are known to be very tough and abrasion-resistant. No information is given with the regard to the puncture-resistance of these films. Furthermore, films of this type can be sealed at relatively low temperatures. However, this represents a contradiction, because low sealing temperatures can only ever be achieved by using soft sealing layers. In the case of the filly symmetric film structure, this would mean an abrasion-sensitive outer layer, which produces a high resistance to friction.

EP 0 613 774 describes a multi-layered, readily thermoformable film with high puncture-resistance. The film has a polyamide on the outer face and a polymer based on olefins on the sealing face. The disadvantage of this film structure is the external polyamide layer because good surface slip of the shaped parts against each other does not result immediately after thermoforming.

WO 94/19186 describes a symmetric film with the film structure polyolefin/bonding agent/PA/EVOH/PA/bonding agent/polyolefin. The polyamide is preferably an aromatic PA, or is derived therefrom, which does not contain any caprolactam. The possibility that the outer bonding agent and polyolefin layers can be pulled away from the film is stressed. Aromatic or partly aromatic polyamides can only be thermoformed in an unsatisfactory manner because the thermoforming temperature has to be higher than the glass transition temperature. Very high glass transition temperatures of 100° C. and higher are known for aromatic and partly aromatic polyamides; thermoforming temperatures of about 70 to 90° C. are desirable. The possibility of thermoforming these films and the surface slip properties of the films immediately after thermoforming are not mentioned at all.

EP 0 686 497 describes the dissimilar sealing of different sealing layers. Particularly good seals are obtained by means of a thin ionomeric sealing layer, which is achieved by the auxiliary sealing layer according to the invention consisting of two components, wherein one of the two components is an ionomer, elastomer, plastomer or carboxyl-modified polyethylene. The surface slip properties of the films in general, in particular immediately after thermoforming, and the puncture-resistance of the films are not discussed. It is known of the polymers, ionomers, plastomers, elastomers and carboxyl-modified polyethylene contained in the sealing layer, that they drastically reduce the surface slip of the films and lead to blocking of the films. Experience has shown that even the addition of antiblocking agents and lubricants can improve the surface slip characteristics of the films only very slightly. In particular, the surface slip of films in the thermoformed regions is completely inadequate.

EP 0 800 915 describes 7-layered, coextruded film structures. The layer sequence polyamide/ethylene/vinyl alcohol copolymer/polyamide is common to all the film structures. Due to the method of manufacture (annular polymer melts cooled with water), the special properties of clarity and processability are ascribed to these films. In the preferred form, the film contains polyamide as a non-sealing outer layer. However, it is known that the surface slip properties of a film are impaired by water cooling. This applies in particular to the outermost polyamide layer. The surface slip can also be improved only marginally by adding additives.

SUMMARY OF THE INVENTION

Thus, there is the object of providing a film designed in such a way that it is tack-free and thermoformable and has a sufficiently high surface slip in the thermoformed areas and has a high puncture-resistance.

This is achieved in accordance with the invention by a multi-layered film prepared by coextrusion, as shown schematically in FIG. 1, with a film structure comprising a) a first outer layer 10 consisting of one or more polyolefins or olefin copolymers or a mixture of these polymers and conventional lubricants and antiblocking agents, b) a second outer layer 18 consisting of one or more polyolefins or olefin copolymers or a mixture of these polymers and conventional lubricants and antiblocking agents, c) an inner layer 13 containing a polyamide or a mixture of several polyamides, d) an inner layer 12 containing an adhesion-promoting polymer or an adhesion-promoting polymer mixture, based on polyolefins or also copolymers derived from polyolefins, e) an inner layer 16 containing an adhesion-promoting polymer or an adhesion-promoting polymer mixture based on polyolefins or copolymers derived from olefins, characterised in that the melting point of the second outer layer 18 is lower than that of the first outer layer 10 and that an additional layer 17 which contains a polyolefin or olefin copolymer or a mixture of these polymers is present between the second outer layer 18 and adhesion-promoting layer 16.

DETAILED DESCRIPTION OF THE INVENTION

The film according to the invention can be extruded on all conventional extrusion devices on which polyamide or polyolefins can be processed.

Outer layer 10 contains polyolefins or olefin copolymers or a mixture of these polymers. LDPE, LLDPE, mPE, I, HDPE, PP, EPC or mixtures of these polymers are preferably used. To improve the surface slip, lubricants and antiblocking agents are added. The amount of lubricant in layer 10 should be between 50 and 2000 ppm, depending on the thickness of the layer. The concentration of antiblocking agent in layer 10 should be between 50 and 3000 ppm, preferably between 100 and 2000 ppm.

The second outer layer 18 contains polyolefins or olefin copolymers or a mixture of these polymers. LDPE, LLDPE, mPE, HDPE, PP, EPC, EVA, EAA, EMAA, I or mixtures of these polymers are preferably used. To improve the surface slip, lubricants and antiblocking agents are added. The amount of lubricant in layer 18 should be between 50 and 2000 ppm, depending on the thickness of the layer. The concentration of antiblocking agent in layer 18 should be between 50 and 3000 ppm, preferably between 100 and 2000 ppm.

The melting point of outer layer 18 is lower than the melting point of the first outer layer 10 and should preferably be at least 5° C. below the melting point of the first outer layer 10. This improves the passage through machines of the films on thermoforming machines because the sealing layer facing the goods being packaged softens before outer layer 10. Outer layer 10 is in contact with the packaging machine and the surface slip properties are adversely affected in the event of softening too soon.

Inner layer 13 preferably contains PA6, PA11, PA12 and PA66 or copolyamides based on these or mixtures of these polymers as a polyamide. Copolyamides are e.g. PA6/66, PA6/12, PA6/6I, PA6/IPDI; PA66/610, PA6/11/66. To improve the oxygen barrier effect or the thermoformability, these polyamides may be mixed with partly aromatic PAs such as e.g. PA6I, PAMXD6, PA6I/6T.

The inner layer consisting of PA may be modified with additives. Suitable additives are e.g. crystallisation agents, lubricants and processing aids.

Furthermore, the polyamides may be modified by sheet-like particles. The sheet-like particles may consist of organic or inorganic substances. The characteristic diameter of the particles is understood to be the longitudinal length of the particle, which is usually less than 700 nm. The oxygen barrier effect or the tensile strength of the film, for example, can be improved by adding these particles.

Inner layers 12 and 16 contain an extrudable bonding agent. Modified polyolefins or olefin copolymers are preferably used as these. The bonding agent increases the bond adhesion between two otherwise non-adhering layers.

Additional inner layer 17 consists of polyolefins and olefin copolymers or mixtures of these polymers. The thermoformability and puncture-resistance, with adequate sealability, are affected in a positive manner if the melting point of layer 17 differs from the melting point of outer layer 18 by more than 3° C. Inner layer 17 and outer layer 18 exhibit sufficient adhesion to each other; an additional adhesion-promoting layer is not required.

In a special embodiment of the invention, a further inner layer is placed between inner layer 13 and adhesion-promoting layer 16, this also consisting of a polyamide. The polyamide in this inner layer differs in composition from the one in layer 13 This may be needed, for example, in order to provide a cost-beneficial opportunity to improve the barrier characteristics of the film to gases, in particular oxygen, or radiation, in particular ultraviolet radiation. In this connection, it is known that specific types of PA can absorb specific wavelengths of UV light and thus are better able to protect sensitive products, such as e.g. meat.

Furthermore, in special cases of application of the invention, an additional layer consisting of EVOH is placed between inner layer 13 and the further inner layer consisting of polyamide, when the oxygen barrier effect which can be achieved with PA is not sufficient.

Films in accordance with the invention are suitable in particular for thermoforming applications. Thermoforming is understood to be the shaping of a film or sheet which is pressed or drawn into a pre-shaped mould, after warming, by means of a compressed air differential or a piston. During the thermoforming process, the rectangular relationship of the film thickness decreases in accordance.

Films according to the invention are also suitable for applications known as lap-seals. Here outer face 10 is sealed with outer face 18. In this case, to produce a high seal strength, both outer faces should have a similar composition in order to achieve a high degree of hot-tack.

Films according to the invention are suitable for packing a wide variety of goods, whether they are present as one or several solid or liquid phases or a combination of the phases mentioned. They are suitable for packaging cold or hot products.

To improve the surface slip properties, conventional lubricants and antiblocking agents may be added to the film. Examples of known antiblocking agents are solid organic or inorganic particles which project from the outer surface of the sealing layer and improve the sliding behaviour in this way such as, for example, silicon dioxide, calcium carbonate, magnesium silicate, aluminium silicate, calcium phosphate, talcum and the like. Of these, silicon dioxide is preferably used. Known organic antiblocking agents are, for example, incompatible polymers such as polyester or polycarbonate. Active amounts are in the range 0.05 to 2 wt. %, preferably 0.1 to 0.8 wt. %. The average particle size is between 1 and 10 $\mu$m, wherein here particles with a spherical shape are particularly suitable. These particles are preferably used in only the two outer layers.

Other additives which improve the surface slip properties of the films, also when combined with the solid particles mentioned, are the substances usually called lubricants such as higher aliphatic acid amides, higher aliphatic acid esters, waxes, metal soaps and polydimethylsiloxanes or other substances such as, for example, are mentioned in Otto Pringer: Verpackungen für Lebensmittel, VCH Verlagsgesellschaft 1993, p. 53. The active amount of lubricant is in the range 0.01 to 3 wt. %, preferably 0.02 to 1 wt. %. The addition of higher aliphatic acid amides in the range 0.01 to 0.25 wt. % is particularly suitable. An aliphatic acid amide which is suitable in particular for the outer layers of the film according to the invention is erucic amide.

The total concentration of lubricant in the film should not exceed 1000 ppm. With thicker films, lower absolute concentrations of lubricant should be striven for, otherwise increased deposition of the lubricant at the surface of the film has to be expected. In the extreme case, optically detectable specks consisting of lubricant may appear on the film.

One or more layers in the film according to the invention may be coloured.

Films according to the invention may contain further additives such as antifog agents or antistatic agents. Known antistatic agents are, according to Hans Domininghaus: Kunststoffe und ihre Eigenschaften, p. 23, VDI-Verlag, 1992, Düsseldorf, the so-called internal antistatic agents ethoxylated tertiary amines of fatty acids or ethoxylated glycol esters of fatty acids or else the external antistatic agents quaternary ammonium salts of fatty acids. Surface active substances which prevent the coating of the film surface with fine water droplets are called antifog agents or also antimist agents. Known antifog agents are, for example, glycerol esters of fatty acids or polyoxyethylenesorbitane monooleate.

Outer layer 18 may be specified as a peel layer. A known process for achieving the peel effect is the addition of polybutylene to polyethylene or ethylenic copolymers such as are described in Ahlhaus: Verpackung mit Kunststoffen, Carl Hanser Verlag, 1997, p. 239

The total thickness of the film according to the invention should preferably be a maximum of 400 μm, particularly preferably less than 300 μm. The thickness of the polyamide layer, with respect to the total thickness of the film, should preferably not exceed 40%. If the film contains EVOH, then the thickness of the EVOH layer, with respect to the total thickness of the film, should preferably be less than 10%, particularly preferably less than 7%. The sum of the thicknesses of the two bonding agent layers, with respect to the total thickness of the film, should preferably be less than 30%, particularly preferably less than 15%.

EXAMPLES

Preparing the Samples

All test samples were prepared on a multi-layer tubular blown film unit. The die temperature was about 220° C. and the widening ratio was about 2.2. The take-up speed was between 9 and 17 m/min, depending on the thickness of film. The granules were mixed in accordance with the mixing ratio and then metered to the extruders. The polymers are characterised in accordance with table 1 below.

TABLE 1

| Name | Density [kg/l] | Viscosity | Comments |
|---|---|---|---|
| PA-1 | 1.14 | | PA6, rel. viscosity of 4 (1% solution, measured in m-cresol) |
| PA-2 | 1.19 | | PA6I/6T, about ⅔ isophthalic and ⅓ terephthalic acids |
| PA-3 | 1.19 | | PA6/66, about 20% comonomers; rel. viscosity of 4.08 (1% solution, measured in 96% $H_2SO_4$) |
| HV-1 | 0.915 | 2.5* | LLDPE grafted with maleic anhydride |
| HV-2 | 0.890 | 5** | EPC grafted with maleic anhydride |
| LLDPE-1 | 0.920 | 1* | LLDPE, comonomer: octene |
| LLDPE-2 | 0.940 | 1* | LLDPE, comonomer: octene |
| LLDPE-3 | 0.918 | 1* | LLDPE, comonomer: butene |
| LDPE-1 | 0.924 | 2* | LDPE |
| LDPE-2 | 0.924 | 0.8* | LDPE |
| LDPE-3 | 0.928 | 0.8* | LDPE |
| EVA-1 | 0.925 | 3* | ethylene/vinyl acetate copolymer with about 5% vinyl acetate |
| EVA-2 | 0.928 | 2* | ethylene/vinyl acetate copolymer with about 4.5% vinyl acetate |
| EPC-1 | 0.897 | 2** | random propylene/ethylene copolymer: melting point 142° C. |
| EPC-2 | 0.900 | 8** | random propylene/ethylene copolymer: melting point 150° C. |
| EPC-3 | 0.900 | 6** | random propylene/ethylene copolymer: melting point 149° C. |

*measured according to ISO 1133 at 190° C. and 2.16 kg
**measured according to ISO 1133 at 230° C. and 2.16 kg The random propylene/ethylene copolymers all had ethylene contents between 1 and 5 wt. %, wherein the temperature of the melting point decreases with increasing ethylene content. The density of the polymers was determined in accordance with ISO 1183.

TABLE 2

| | Layer 10 | | Layer 12 | Layer 13 | Layer 16 | Layer 17 | Layer 18 |
|---|---|---|---|---|---|---|---|
| Ex. 1 | | | EPC-2 | HV-2 | 95% PA-1 + 5% PA-2 | HV-1 | LLDPE-1 | 66% LLDPE-2 + 33% LLDPE-1 |
| M. pt. | | | 151° C. | 149° C. | 217° C. | 121° C. | 120° C. | 124° C. |
| Thickness | | | 9 μm | 4 μm | 20 μm | 4 μm | 10 μm | 12 μm |
| Comp. 3 | 95% PA-1 + 5% PA-2 | HV-1 | LLDPE-1 | HV-1 | PA-1 | HV-1 | | 67% LLDPE-2 + 33% LDPE-1 |
| M. pt. | 217° C. | 121° C. | 120° C. | 121° C. | 218° C. | 121° C. | | 124° C. |
| Thickness | 10 μm | 4 μm | 10 μm | 4 μm | 10 μm | 4 μm | | 18 μm |
| Ex. 2 | | | EPC-2 | HV-2 | 95% PA-1 + 5% PA-2 | HV-1 | LLDPE-1 | 67% LLDPE-2 + 33% LLDPE-1 |
| M. pt. | | | 151° C. | 149° C. | 217° C. | 121° C. | 120° C. | 124° C. |
| Thickness | | | 20 μm | 7 μm | 40 μm | 7 μm | 13 μm | 23 μm |
| Comp. 4 | 95% PA-1 + 5% PA-2 | HV-1 | LLDPE-1 | HV-1 | PA-1 | HV-1 | | 67% LLDPE-2 + 33% LDPE-1 |

TABLE 2-continued

|  |  | Layer 10 | Layer 12 | Layer 13 | Layer 16 | Layer 17 | Layer 18 |
|---|---|---|---|---|---|---|---|
| M. pt. | 217° C. | 121° C. | 120° C. | 121° C. | 218° C. | 121° C. |  | 124° C. |
| Thickness | 25 μm | 7 μm | 19 μm | 7 μm | 105 μm | 7 μm |  | 30 μm |
| Ex. 5 |  |  | LDPE-2 | HV-1 | PA-3 | HV-1 | LLDPE-3 | EVA-1 |
| M. pt. |  |  | 110° C. | 121° C. | 189° C. | 121° C. | 121° C. | 104° C. |
| Thickness |  |  | 22 μm | 7 μm | 37 μm | 7 μm | 18 μm | 30 μm |
| Comp. 6 |  |  | EPC-3 | HV-2 | PA-3 | HV-1 |  | EVA-1 |
| M. pt. |  |  | 148° C. | 149° C. | 189° C. | 121° C. |  | 104° C. |
| Thickness |  |  | 16 μm | 7 μm | 40 μm | 9 μm |  | 40 μm |
| Ex. 7 |  |  | LDPE-2 | HV-1 | PA-1 | HV-1 | LDPE-1 | EVA-2 |
| M. pt. |  |  | 110° C. | 121° C. | 218° C. | 121° C. | 121° C. | 104° C. |
| Thickness |  |  | 45 μm | 2 μm | 75 μm | 13 μm | 41 μm | 52 μm |
| Comp. 8 | 50% LDPE-3 + 50% LLDPE-3 | HV-1 | PA-1 | HV-1 | PA-1 | HV-1 |  | EVA-2 |
| M. pt. | 118° C. | 121° C. | 218° C. | 121° C. | 218° C. | 121° C. |  | 104° C. |
| Thickness | 43 μm | 17 μm | 35 μm | 16 μm | 36 μm | 17 μm |  | 48 μm |

M. pt.: Melting point of layer
Ex.: Example
Comp.: Comparison example

Methods of Measurement

Puncture-resistance was used to assess films which are subjected to attack by pointed items. Puncturing work is the work required in order to pierce a stretched-out, membrane-like film. A circular sample with a diameter of 80 mm is taken from a film sample and inserted like a membrane into the sample-holder in an electronic tensile testing machine. The sample-holder has a free diameter of 50 mm. The puncturing work is determined from the integral of the force times the pathlength which is required to pierce the sample. It is cited as N*cm. The test spike had a cone ground down to less than 90° with a diameter of 1 mm at its tip. The sample is pierced at a speed of 100 mm/min.

Thermoforming Tests

On a horizontal thermoforming machine (Tiromat 3000 from the Alfa Laval Co.) the films are subjected to a test approximating to the real situation. The thermoforming behaviour of the films at a thermoforming temperature of 90° C. is tested. The heating and shaping time is 3 seconds. The size of the shaped part is 183 mm×114 nm (width× length), wherein the thermoforming depth is increased by 5 mm at a time until the film tears during the thermoforming process. The greatest depth at which the film does not tear is recorded.

Surface Slip of the Shaped Parts Against Each Other

On a horizontal thermoforming machine (Tiromat 3000 from the Alfa Laval Co.) the films are subjected to a test approximating to the real situation. The thermoforming behaviour of the films at a thermoforming temperature of 90° C. is tested. The heating and shaping time is 3 seconds. The size of the shaped part is 184 mm×114 mm (width× length), the thermoforming depth is 60 mm. The bases of the shaped parts are rubbed against each other, using slight hand-pressure, immediately after being thermoformed, by at least three test persons. If the shaped parts can be displaced with respect to each other, the surface slip is sufficiently good and is labelled with "+". If the shaped parts cannot be displaced with respect to each other, they are awarded a "−".

Determining the Melting Point of Plastics Films with the Melt Table Microscope

The test method is used to determine the melting point of one layer in a plastics film. The melting point is understood to be the temperature at which the crystal lattice breaks down under atmospheric pressure. The samples being measured (a microtome section from the film) is heated on a heating table and observed through a microscope using polarised transmitted light. If the film consists of a partly crystalline, double refracting plastic material, it loses this property at the time it melts, which can be observed using polarised light with the sample inserted between crossed polarisation filters. If the film layer has too weak, or no, double refraction, then non-polarised light can be used and the temperature range over which melting onto a microscope slide takes place is observed. In most cases, the melting point can be cited with an accuracy of +/−1° C.

| Sample | Max. thermo-forming depth [mm] | Surface slip of dips against each other | Puncturing work [N*cm] |
|---|---|---|---|
| Ex. 1 | 80 | + | 1.7 |
| Comp. 3 | 65 | − | 1.6 |
| Ex. 2 | 85 | + | 2.9 |
| Comp. 4 | 80 | − | 2.5 |
| Ex. 5 | 95 | + | 2.8 |
| Comp. 6 | 95 | + | 2.6 |
| Ex. 7 | 85 | + | 2.4 |
| Comp. 8 | 85 | + | 2.0 |

The comparison of the examples and comparison examples is chosen so that the films being compared contain comparable types and have a comparable total thickness.

BRIEF DESCRIPTION OF THE DRAWINGS

FIG. 1 shows an embodiment of the multi-layered Mm wherein:

Figure 1:
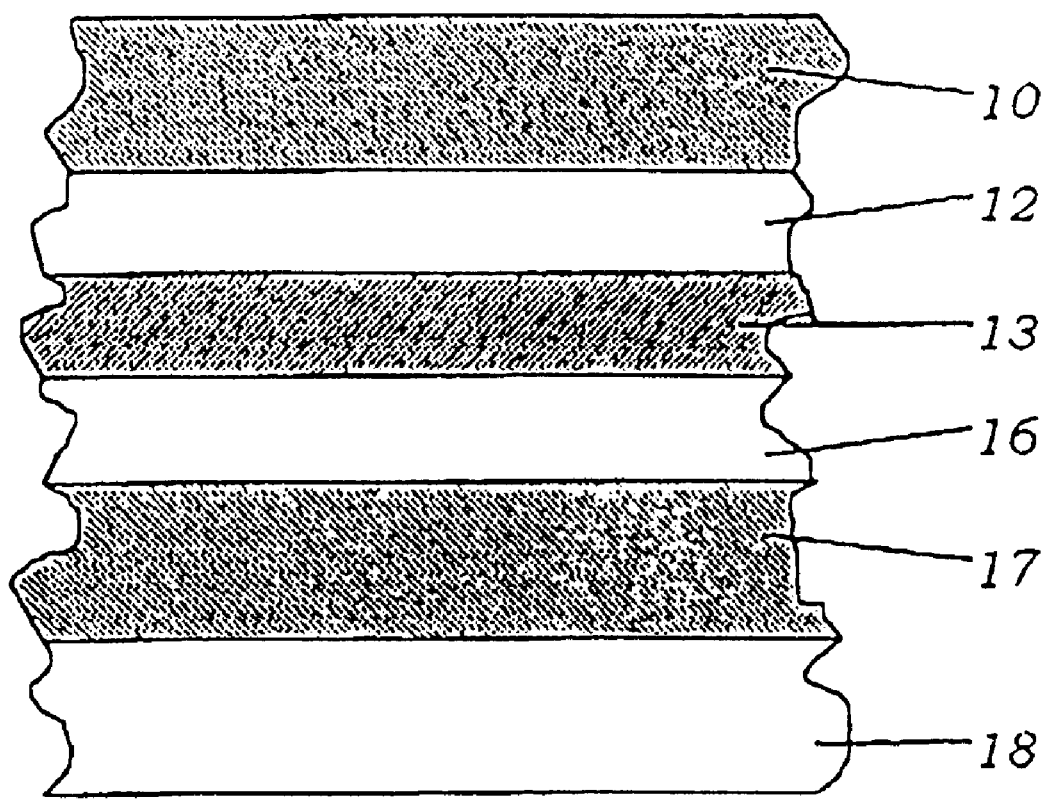

a) is a first outer layer consisting of one or more polyolefins or olefin copolymers or a mixture of these polymers and conventional lubricants and antiblocking agents, b) 18 is a second outer layer consisting of one or more polyolefins or olefin copolymers or a mixture of these polymers and conventional lubricants and antiblocking agents, c) 13 is an inner layer containing a polyamide or a mixture of several polyamides, d) 12 is an inner layer containing an adhesion-promoting polymer or an adhesion-promoting polymer mixture, based on polyolefins or copolymers derived from polyolefin, e) 16 is an inner layer containing an adhesion-promoting polymer or an adhesion-promoting polymer mixture based on polyolefins or copolymers derived from olefins, characterized in that the melting point of the second outer layer 18 is lower than that of the first outer layer 10 and that an additional layer 17 which contains a polyolefin or olefin copolymer or a mixture of these polymers is present between the second outer layer 18 and an adhesion-promoting layer 16.

What is claimed is:

1. A multi-layered film prepared by coextrusion, with a structure comprising
   a) a first outer layer consisting of:
      (1) one or more polyolefins or olefin copolymers or a mixture of these polymers;
      (2) lubricants; and
      (3) antiblocking agents,
   b) a second outer layer consisting of:
      (1) one or more polyolefins or olefin copolymers or a mixture of these polymers;
      (2) lubricants; and
      (3) antiblocking agents,
      wherein the melting point of the second outer layer is lower than that of the first outer layer,
   c) a first inner layer containing an adhesion-promoting polymer or an adhesion-promoting polymer mixture based on polyolefins or olefin copolymers or a mixture of these polymers, which is situated between the first outer layer and the second inner layer,
   d) a second inner layer containing a polyamide or a mixture of several polyamides, which is situated between the first inner layer and the third inner layer,
   e) a third inner layer containing an adhesion-promoting polymer or an adhesion-promoting polymer mixture based on polyolefins or olefin copolymers or a mixture of these polymers, which is situated between the second inner layer and the fourth inner layer,
   f) a fourth inner layer containing a polyolefin or olefin copolymer or a mixture of these polymers, which is situated between the third inner layer and the second outer layer.

2. The film of claim 1 wherein the melting point of the second outer layer is at least 5° C. lower than the melting point of the first outer layer.

3. The film of claim 1 wherein the polymers in the fourth inner layer adhere to the second outer layer and its melting point differs from the melting point of the second outer layer by more than 3° C.

4. The film of claim 1 wherein it is tack-free.

5. The film of claim 1 wherein the first outer layer contains a member selected from PP, EPC, mPE, LDPE, LLDPE, HDPB, I and mixtures of these polymers.

6. The film of claim 1 wherein the second outer layer contains a member selected from PP, EPC, mPE, LDPE, LLDPE, HDPE, EVA, EMAA, EAA, I and mixture of these polymers.

7. The film of claim 1 wherein the second inner layer contains a polyamide selected from PA6, PA11, PA12, PA66, PA6/66, PA6/12, PA6/6I, PA66/11/66, PA6/IDPI, PA6I/6T, PAMXD6, PA6I and mixtures of these polyamides.

8. The film of claim 1 wherein the first inner layer contains polyolefins or olefin copolymers grafted with unsaturated dicarboxylic acids.

9. The film of claim 1 wherein the third inner layer contains polyolefins or olefin copolymers grafted with unsaturated dicarboxylic acids.

10. The film of claim 1 wherein the first outer layer and the second outer layer contain, as lubricant, higher aliphatic acid alludes, higher aliphatic acid esters, waxes, metal soaps or polydimethylsiloxane and, as antiblocking agent, solid organic or inorganic spacers.

11. The film of claim 1 wherein a further inner layer is arranged between the second inner layer and the third inner layer, this reducing the permeability of gases or radiation.

12. The film of claim 11 wherein an additional inner layer consisting of EVOH is arranged between the second inner layer and said further inner layer.

13. A method of packaging sharp-edged goods which comprises of wrapping the sharp edge(s) of said goods with the film of claim 1.

14. The method of claim 13 wherein the sharp-edged goods are foodstuffs.

15. The multi-layered film of claim 1, wherein the amount of lubricants in the first and second outer layer are independently of each other are present in the range of 50 to 2000 ppm and the amount of antiblocking agents in the first and second outer layer are independently of each other are present in the range of 50 to 3000 ppm.

16. The multi-layered film of claim 1, wherein the amount of antiblocking agents in the first and second outer layer are independently of each other are present in the range of 100 to 2000 ppm.

17. The multi-layered film of claim 1 wherein:
   (1) the melting point of the second outer layer is at least 5° C. lower than the melting point of the first outer layer; and
   (2) the fourth inner layer adhere to the second outer layer and its melting point differs from the melting point of the second outer layer by more than 3° C.

* * * * *